Dec. 7, 1943.  H. B. COMBES  2,336,393
DEPTH GAUGE
Filed March 23, 1942
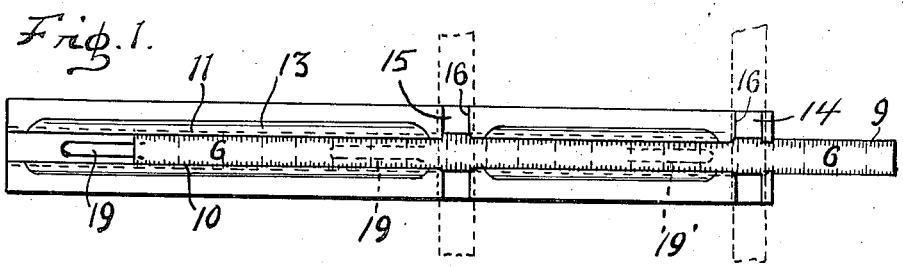
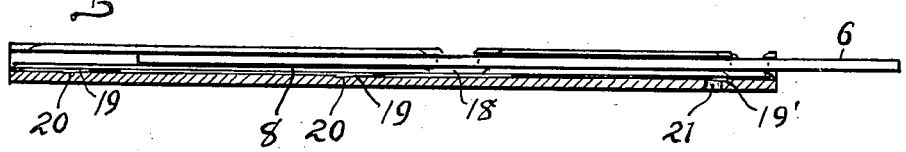
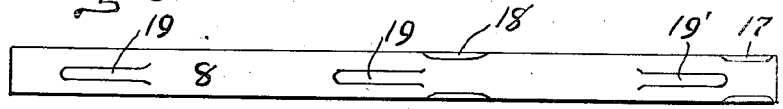
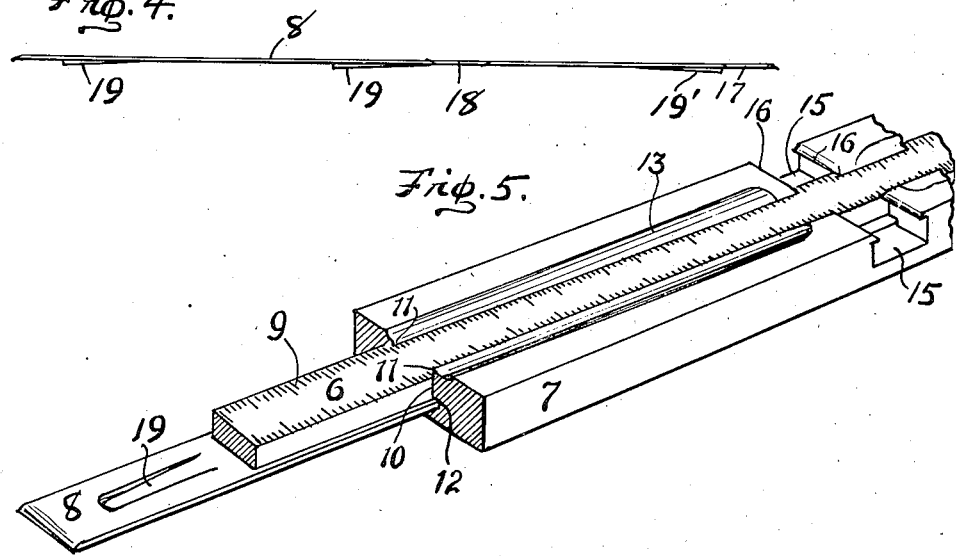
Harry B. Combes INVENTOR.
BY W. G. Burns Attorney Patented Dec. 7, 1943

2,336,393

UNITED STATES PATENT OFFICE 2,336,393

DEPTH GAUGE

Harry B. Combes, Fort Wayne, Ind.

Application March 23, 1942, Serial No. 435,809

1 Claim. (Cl. 33—161)

This invention relates to improvements in a depth gauge for use by machinists, carpenters and other artisans in determining the depth of a die cavity, crevice, recess, mortise or the distance between opposing planes in a structure where one of the planes is more or less inaccessible.

An object of the invention is to afford an instrument for measuring distances between surfaces of a work piece where the space between the surfaces is restricted by surrounding walls or other obstructions, and to construct the instrument so as to permit its use in closely confined quarters.

Another object of the invention is to provide a gauge having a rule and holder therefor associated with a frictional detent to secure the rule in definite adjusted positions in the holder.

A further object of the invention is to form the holder so the rule while movably disposed therein has an exposed surface throughout its length, thus to facilitate reading the graduations thereon.

And a still further object of the invention is to form the holder and the detent so the rule is movably secured and frictionally held selectively in a longitudinal position in the holder or in one or more transverse positions relative thereto.

Other objects and advantages of the invention appear in the following description.

An illustrative embodiment of the invention is shown in the accompanying drawing, in which:

Fig. 1 is a top plan view of a gauge in which the invention is incorported;

Fig. 2 is a side elevational view projected from Fig. 1 and partially in section;

Fig. 3 is a top plan view of a detent forming a part of the instrument, projected from Fig. 1;

Fig. 4 is a side elevational view of the detent; and

Fig. 5 is a fragmentary perspective view showing the parts assembled for use in one of the several operative positions.

The illustrative embodiment of the invention consists of a graduated rule 6, a rule holder 7 and a detent 8 assembled in operative relation with each other.

The rule 6 is of the usual type, straight, uniform in length, breadth and thickness, and having marginal graduations 9 along its sides.

The holder 7 consists of a straight bar uniform in width, thickness, and preferably of the same length as the rule, its width and thickness being proportionately greater. The bar has made therein an open slot 10 that extends uniformly throughout its entire length from one end of the bar to the other. The opposing inner walls along the slot are undercut to provide narrow inwardly extending ledges 11 along the top of the slot and underlying longitudinal gains 12 extending along the bottom of the slot. Those portions of the bar 7 immediately overlying the ledges 11 are chamfered to provide a thumbway 13.

Adjacent one end of the bar 7 is made a transverse slot 14 that intersects the longitudinal slot 10 and extends to the sides of the bar, and another similar transverse slot 15 is made in the bar in its mid portion, each of said transverse slots having inwardly extending ledges 16.

The detent 8 consists of a flat strip of spring metal of approximately the same length as the bar 7 and is disposed in the bottom of the longitudinal slot thereof with its marginal side edges extending in the gains 12. Each end of the strip is beveled downwardly to form a sharp edge, and also certain side portions 17 and 18 are beveled to a sharp edge. These beveled side portions are so located that when the strip is positioned in the holder bar they correspond with the transverse grooves 14 and 15 respectively with their sharp edges extending entirely across the transverse slots. The strip has a series of spring tongues 19—19' that extend slantingly downward and bear against the bottom face of the slot 10 in depressions 20—20' made therein. The tongues thus engaged have the effect of holding the strip yieldingly bolstered in its uppermost position in the holder. One of the tongues 19 extends longitudinally in the opposite direction respecting the other tongues 19 so when all the tongues are engaged in their respective notches 20—20', the strip is locked in the holder against relative longitudinal displacement.

An opening 21 is made through the bottom wall at a point beneath the tongue 19' to permit the insertion of a prod (not shown), by which the tongue is pressed out of engagement with its notch 19' so the detent may be slid lengthwise out of the holder.

The rule 6 is positioned in the holder selectively in the longitudinal slot 10 or either of the transverse slots 14—15 by sliding the rule into the selected slot endwise between the detent strip and the corresponding ledges 11—16 by which the rule is frictionally held in various adjusted positions when disposed in either slot in the holder. As the ends and certain side portions of the detent strip are downwardly beveled the rule thus is unobstructed when introduced into the holder where it is held by upward pressure of the detent strip against its bottom face.

The upper face of the rule is at all times exposed to view between the opposing ledges so the graduations 9 may easily be read.

In use, the rule is slid endwise in the holder so one end of the rule projects therefrom a distance approximating the depth of the cavity in the workpiece to be measured. The instrument is then applied by inserting the projecting end of the rule into the cavity until its end reaches the bottom of the cavity while the holder rests squarely upon the surface of the workpiece surrounding the cavity. Upon removal of the instrument from the workpiece while the holder and rule are held by the detent in the relative positions to which they have been adjusted, the depth of the cavity is then indicated and determined by reading that portion of the graduations that appear on the rule beyond the holder.

Variations from the particular construction above disclosed may readily be made by exercise of engineering skill without departure from the spirit or scope of the invention, and the following claim are intended to be inclusive of such variations.

What I claim is:

A depth gauge constituted of a rule holder having a longitudinal slot extending throughout its length and provided with ledges overhanging said slot at the top thereof and internal gains in its inner walls adjacent the base thereof, a bolster strip in said slot the sides of which extend into said gains and provided with spring tongues to hold said strip upwardly, and a graduated rule slidably disposed in said slot between said ledges and strip, so that said rule is frictionally held in adjusted position in said holder.

HARRY B. COMBES.